July 4, 1961
G. A. MARSH ET AL
2,991,439
CORROSION TESTING PROBE
Filed May 23, 1960
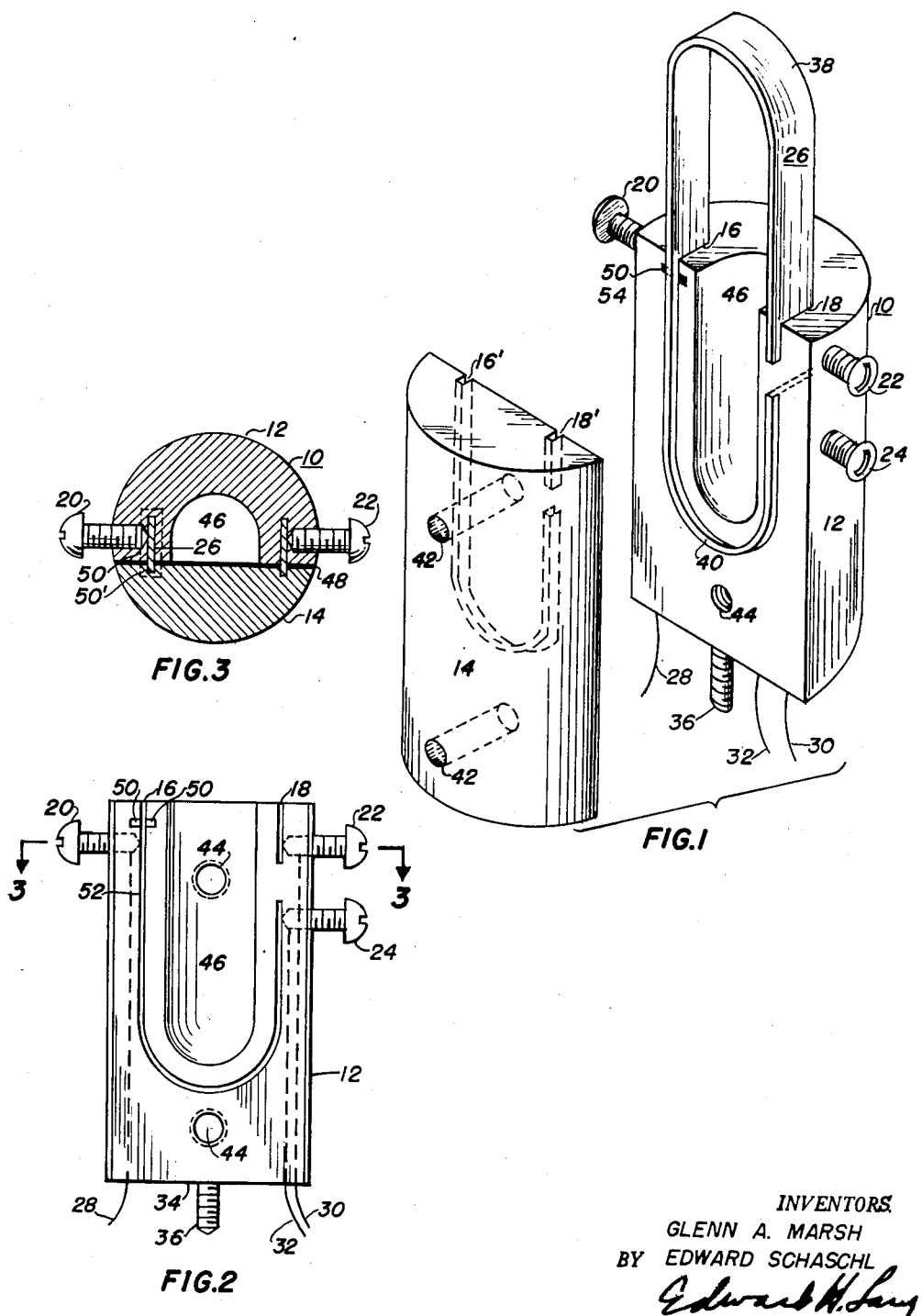
INVENTORS.
GLENN A. MARSH
BY EDWARD SCHASCHL
Edward H. Lang
ATTORNEY.

United States Patent Office 2,991,439
Patented July 4, 1961

2,991,439
CORROSION TESTING PROBE
Glenn A. Marsh and Edward Schaschl, Crystal Lake, Ill., assignors to The Pure Oil Company, Chicago, Ill., a corporation of Ohio
Filed May 23, 1960, Ser. No. 30,830
7 Claims. (Cl. 338—13)

This invention relates to a corrosion-testing probe designed so that single-strip test specimens used therewith can be easily replaced, and test specimens fabricated of various materials can be used with a single probe. The invention lies particularly in the conception of a probe structure which permits the use of a single-strip, metallic coupon, a portion of which coupon is enclosed within and protected by the probe body, while the other portion of the coupon is exposed to the corrosive environment under study.

Previous designs of corrosion-test probes have left the assembly of the test specimens to a matter of fabrication wherein a common juncture must be welded between two test elements, one of which must be protected by a corrosion-impervious coating. The ends of the test specimens were further provided with welded or soldered connections to achieve electrical contact and mechanical support. The prior art further teaches the use of corrosion probes adapted to support and provide electrical contact with two strip-like metallic specimens, which are replaceable. The need for a simple probe body capable of utilizing a unitary test specimen, which is readily insertable in the probe so that a portion of the length of the test specimen is protected from the corrosive environment while the other portion is exposed, has not been met.

The test probe of this invention utilizes the methods which have been devised which make use of the correlation between change in electrical conductivity and change in cross-sectional area to determine the rate of corrosion of various materials of construction through the use of a corrosion-test probe connected to electric resistance-change meters. These instruments, known and widely used in the art, employ resistance bridges and function like analogue computers to indicate quantitatively a change in physical characteristics which can not be conveniently measured by other methods. There are several recent modifications of this principle. One such modification is described in a co-pending application of the instant inventors filed August 12, 1955, Serial Number 528,032. This application describes means for compensating for temperature changes wherein one test specimen is mounted in exposed condition to the corrosive atmosphere and another test specimen is insulated or protected from the corrosive atmosphere by means of a suitable protective coating placed thereon. The coupons or test specimens are connected in a circuit so as to comprise one-half of a typical resistance bridge. Suitable electrical connections are made with the other half of the bridge, which is placed outside of the corrosive environment together with the power supply to the bridge. An appropriate electrical meter, such as a galvanometer, functions as a null detector. Loss of metal on the unprotected specimen induces small increases in resistance in the circuit, which increases are proportional to the metal loss of the unprotected specimen. Metal loss may be calculated by appropriate formulae described in the afore-named co-pending application.

The corrosion-test probe of the present invention may be used in conjunction with the electronic circuitry described in the foregoing application. Other devices to measure changes in resistance ratio may also be used. The corrosion-test probe of this invention is in part an improvement over the test probes previously proposed in that it is adapted to permit rapid and convenient replacement of the single test specimen which it employs.

It becomes therefore a primary object of this invention to provide a corrosion-test probe to be used with an electrical resistance-measuring apparatus adapted to determine the corrosivity of an environment under conditions of moderate temperature and pressure. Another object of this invention is to provide a new form of corrosion-test probe having novel means for holding the test specimen. Another object of this invention is to provide a corrosion-test probe adapted for use with test specimens fabricated of materials which comprise single-strip metallic coupons which may be readily inserted in or removed from the probe. Yet another object of this invention is to provide a test probe useful in corrosion studies in which the test specimen can be replaced with greater ease than has been possible heretofore.

Basically, the test probe of this invention consists of a rigid, electrically non-conductive body which is divided longitudinally into two pieces in order that it can be taken apart to expose mating grooves which cooperate to form a channel in which a strip or a wire of metal to be tested can be placed in such a way that part of the length of the strip becomes an exposed test element, while the other part becomes a protected reference and temperature-compensating element. The strip is held in place, and connected to lead wires by means of three terminals, one of which contacts the strip at an intermediate point, and the other two of which contact the strip at its ends. The lead wires contact the terminals, pass through the body of the probe, and extend from the base thereof so that they are readily accessible for connection in a conventional measuring circuit.

This invention is best described with reference to an embodiment shown in the drawing, of which:

FIGURE 1 is an isometric, exploded view of the novel test probe.

FIGURE 2 is a frontal elevation of the rear portion of the test probe depicted in FIGURE 1.

FIGURE 3 is a cross-sectional view of the test probe body taken in the direction 3—3.

Body 10 of the probe, which may be made of rigid, electrically non-conductive, solid material, such as plastic, is divided longitudinally into sections 12 and 14. In these two sections are provided pairs of mating grooves, 16 and 16′, 18 and 18′, adapted to form two channels when the mating faces of sections 12 and 14 of the probe are placed in juxtaposition. Section 12 of the probe is further provided with set screws 20, 22 and 24, which are arranged so that they bear against the single-strip test specimen 26 when it is positioned in the grooves. Lead wires 28, 30, and 32 are connected to set screws 20, 22, and 24, respectively. All three lead wires pass through the body of the probe within probe section 12, and pass through surface 34 of the probe base for connection in appropriate measurement circuits. Stud 36 extends through surface 34, is firmly secured within portion 12 of the probe, and provides means for anchoring the probe in the desired position.

Test specimen 26 is of a length such that set screw 20 bears against its mid-point when the ends of the specimen are in position at screws 22 and 24. In other words, the length of specimen 26 is approximately twice the distance along groove 16 from screw 20 to screw 24. Thus, screw 20 divides specimen 26 into exposed test portion 38 and protected, temperature-compensating, reference portion 40. The cross-sectional shape of slots 16 and 16′ and of slots 18 and 18′ is made to correspond with the shape of test specimen 26. Two screws, not shown, pass through holes 42 in portion 14 of the probe and mate with threaded holes 44 in portion 12 of the probe to hold the two portions securely together. Hollowed zone 46 is provided to achieve improved thermal contact between the probe and the corrosive environment, to make reference section 40 more rapidly responsive to variations in temperature of the corrosive environment under study. A sealing gasket 48 is preferably provided between the two mating faces of the two probe portions 12 and 14. Alternatively, a thin film of sealant may be applied to either face before assembly of the probe. Portions 12 and 14 of the probe are further provided with recesses 50 and 50', of which only recess 50 is visible in the drawing. Recess 50 is located adjacent to groove 16 between set screw 20 and the external terminus 52 of the groove. When the probe is assembled, recesses 50 and 50' cooperate to form an elliptical annular recess which encompasses test specimen 26 adjacent to its mid-point. Seal 54 is located within this recess and serves to prevent entry of corrosive fluid into the channel formed by grooves 16 and 16'. Seal 54 is preferably formed of a resilient material and is of sufficient size to be slightly compressed within the recess when the probe is assembled. Seal 54 may be slit to permit insertion of test element 26, or alternatively may be made in two halves, one of which is disposed in recess 50, and the other in recess 50'.

In use, a strip of metal to be tested is positioned in the grooves, the set screws are tightened, and the two body sections are clamped together, thereby forming a corrosion-test probe providing a test element exposed to the environment under study, and a temperature-compensating reference element protected from the environment. The lead wires are connected to any suitable resistance-change measurement circuit. Corrosion measurements are then made in the conventional way. At the conclusion of the tests, the probe is disassembled, and the test specimen is removed and replaced. The probe is then ready for re-use.

The materials used in fabricating the test probe, which may be subject to elevated temperatures, should be constructed of such plastics as are resistant to corrosion and have high electrical resistance. Suitable materials include Bakelite and Lucite. The seals may be constructed of paper and fabric laminates such as the phenolic and epoxy resins. The maximum temperatures at which these materials may be used is about 400° F. Because of the peculiar construction of the test probe of this invention, there is no necessity for applying a protective coating to a portion of the test specimen, since the compensating portion is sealed within the test probe. The test specimen itself may be of various shapes, such as ribbon-like or in the shape of wire. Although it is not necessary that the test specimens be of such length as to provide about equal portions within and without the probe, it is well known to those skilled in this art that, as a practical matter, by using test specimens which are divided approximately in half by screw 20, the corrosion-test probe functions accurately when connected with the bridge-measuring circuit without the necessity of tedious calibration. The various electrical contacts such as 20, 22, and 24, may be made of copper or silver. In general, metals which are not subject to corrosive attack in the environment under study should be selected.

From this description, it is apparent that the invention is necessarily confined to the use of test specimens which have the property of conducting electricity. The materials of construction that meet these requirements include metals and metal alloys, such as steel, iron, bronze, brass, copper and the like. The environment to be investigated by the test elements may be in any physical state, or may exist as a mixture of substances in different physical states. The corrosive environment may be gaseous, vaporous, liquid, solid, semisolid, or a mixture of these forms of matter. Examples include corrosive gases, such as the halogens, acidic or basic solutions, flue gases, and carrier liquids containing high contents of solids, such as catalyst particles. Environments such as these may be considered to be corrosive either because of their mechanical or chemical effects, or a combination of these effects which result in a loss of portions of the exposed test specimen.

It is evident that various mechanical modifications of the disclosed structure can be made without departing from the spirit and scope of this invention. For example, the channel in which the test specimen is placed may be a single groove formed in one portion only of the probe body. In this instance, the mating face of the other portion of the probe will be flat and contain no groove. A resilient gasket or sealant coating may be applied to the ungrooved portion of the probe body. Electrical terminals or contacts, well known to those skilled in the art, other than the screws depicted may be employed. Such terminals may be formed in place in the probe body when it is fabricated, as by molding.

The embodiments of the invention in which a special property or privilege is claimed are as follows:

1. A corrosion-test probe for supporting a corrodible test specimen comprising a body member having an outer surface of corrosion-resistant material, said body member being split into two portions having mating faces, one said mating face having formed therein two grooves cooperating with said other mating face to form two channels, one said channel being adapted to receive and enclose a portion of the length of said test specimen, the other said channel being adapted to receive an end portion of said test specimen, one end of each of said channels terminating within said body member, the other end of each of said channels communicating with the outer surface of said body member, three terminals supported by said body member and adapted to electrically contact said test specimen, said terminals being located adjacent to the interiorly terminating ends of said channels, and the exteriorly communicating end of said one channel, respectively, three conductors respectively connected to said three terminals and extending from within said body member, and means for securing said two body-member portions securely together.

2. A corrosion-test probe for supporting a corrodible test specimen comprising a body member having an outer surface of corrosion-resistant material, said body member being split into two portions having mating faces, said mating faces having formed thereon first corresponding grooves forming a first channel to receive and enclose a portion of the length of said test specimen, said mating faces having formed thereon second corresponding grooves forming a second channel to receive an end portion of said test specimen, one end of each of said channels terminating within said body member, the other end of each of said channels communicating with the outer surface of said body member, three terminals supported by said body member and adapted to electrically contact said test specimen, said terminals being located adjacent to the interiorly terminating ends of said first and second channels, and the exteriorly communicating end of said first channel, respectively, three conductors respectively connected to said three terminals and extending from within said body member, and means for securing said two body-member portions securely together.

3. A probe in accordance with claim 2 including sealing means encompassing said first channel at a point between the externally communicating end of said channel and the terminal adjacent thereto, to prevent entry of fluid into said channel beyond said sealing means.

4. A probe in accordance with claim 3 including a thin layer of sealing material disposed between said mating faces.

5. A corrosion probe in accordance with claim 3 in which said channel encompassing sealing means comprises an elastomer disposed in an elliptical annular recess.

6. A corrosion probe in accordance with claim 5 in which said means for securing comprises bolt means extending through said body member perpendicular to said mating faces.

7. A corrosion probe in accordance with claim 5 including a hollow portion communicating with the exterior of said probe and having a surface adjacent to and paralleling said first channel.

References Cited in the file of this patent

UNITED STATES PATENTS

| | | |
|---|---|---|
| 2,851,570 | Schaschl | Sept. 9, 1958 |
| 2,864,252 | Schaschl | Dec. 16, 1958 |